United States Patent [19]

King et al.

[11] Patent Number: 5,516,432
[45] Date of Patent: May 14, 1996

[54] METHOD FOR PREVENTION OF SCALE FORMATION IN AQUEOUS SYSTEMS

[75] Inventors: Kathleen J. King, Chalfont; William M. Hann, Gwynedd; Barry Weinstein, Dresher, all of Pa.

[73] Assignee: Rohm and Haas Company, Philadelphia, Pa.

[21] Appl. No.: 342,951

[22] Filed: Nov. 21, 1994

[51] Int. Cl.$^6$ ..................................................... C02F 5/12
[52] U.S. Cl. ................................... 210/701; 252/180
[58] Field of Search ........................ 210/698–701; 252/180

[56] References Cited

U.S. PATENT DOCUMENTS

| | | | |
|---|---|---|---|
| 3,709,815 | 1/1973 | Boothe et al. | 210/701 |
| 3,806,367 | 4/1974 | Lange et al. | 210/701 |
| 3,928,196 | 12/1975 | Persinski et al. | 210/701 |
| 4,640,793 | 2/1987 | Persinski et al. | 210/701 |
| 4,711,725 | 12/1987 | Amick et al. | 210/701 |
| 4,784,774 | 11/1988 | Amjad et al. | 210/701 |
| 4,952,327 | 8/1990 | Amajd et al. | 210/701 |

OTHER PUBLICATIONS

"Choosing the Correct Cooling–Water Program" by J. R. Macdonald, Chemical Engineering, Jan. 1987.

*Primary Examiner*—Peter A. Hruskoci
*Attorney, Agent, or Firm*—Thomas J. Howell

[57] ABSTRACT

A process for stabilizing aqueous systems containing scale-forming salts by adding to such systems an effective amount of selected low molecular weight water-soluble polymers containing from 30 to 60 weight percent unsaturated sulfonic acid units, from 35 to 65 weight percent carboxylic acid units and optionally up to 10 weight percent of one or more units selected from non-ionizable monomers, is provided. The polymers used in the process provide improved phosphate and iron stabilization at high temperature conditions. A polymer composition based on 50/50 weight/weight 2-acrylamido-2-methyl-1-propanesulfonic acid/acrylic acid is particularly preferred for use at high temperatures, for example, from 80° to 100° C.

16 Claims, No Drawings

METHOD FOR PREVENTION OF SCALE FORMATION IN AQUEOUS SYSTEMS

BACKGROUND

This invention relates to an improved process for preventing scale formation and enhancing corrosion inhibition in aqueous systems by the addition of small quantities of low molecular weight, water-soluble polymers. More particularly the invention relates to the selection of monomers which when polymerized together form polymer compositions that exhibit unexpectedly improved precipitation inhibition and corrosion inhibition for aqueous systems, such as cooling waters, that contain phosphates, iron, zinc and other scale-forming salts.

Many industrial applications and residential areas utilize water containing relatively high concentrations of inorganic salts. These salts are formed by the reaction of metal cations, such as calcium, magnesium or barium, with inorganic anions such as phosphate, carbonate and sulfate. These salts have low solubilities in water and as their concentration in solution increases, or as the pH or temperature of the water containing them increases, these salts tend to precipitate from solution, crystallize and form hard deposits or scale on surfaces. Scale formation is a problem in heat transfer devices, boilers, oil recovery operations and on clothes washed with such hard waters.

Many cooling water systems, including industrial cooling towers and heat exchangers made from carbon steel, experience corrosion problems caused by the presence of dissolved oxygen. Corrosion is combated by the addition of various inhibitors such as orthophosphate, polyphosphate and zinc compounds, alone or in combination. The addition of phosphates, however, adds to the formation of highly insoluble phosphate salts such as calcium phosphate. The addition of zinc compounds can also lead to the precipitation of insoluble salts such as zinc hydroxide, and zinc phosphate. Other inorganic particulates, such as mud, silt and clay, are commonly found in cooling water. These particulates tend to settle onto surfaces and thereby restrict water flow and heat transfer unless they are effectively dispersed.

Processes that would benefit from an additive that would inhibit the precipitation of scale-forming materials include, for example, cooling water, boiler water, geothermal process water, sugar processing and desalting operations using distillation processes. In each of these processes, heat is transferred to or from the water and can aggravate precipitation problems in a variety of ways.

The stabilization of aqueous systems containing scale-forming salts involves one or more mechanisms. Antiprecipitation involves the delay of precipitation by limiting the size of the salts to sub-colloidal dimensions possibly by adsorption of the inhibitor onto the salt crystal soon after nucleation, thereby interfering with further crystal growth. Another stabilization mechanism involves the ability of the inhibitor to interfere with and distort the crystal structure of any scale formed making the scale more easily fracturable and dispersable.

A variety of methods have been employed to stabilize aqueous systems. Polymers derived from (meth)acrylic acids and salts as well as mixtures of such polymers with other compounds and polymers have been used as precipitation inhibitors for aqueous systems.

U.S. Pat. No. 3,709,815 discloses polymers having molecular weights greater than 20,000 containing 15–100 mole percent 2-acrylamido-2-methyl-1-propanesulfonic acid/0–85 mole percent acrylic acid or acrylamide for dispersing calcium phosphate precipitates at room temperature and proposes the polymers for use in high temperature boiler systems.

U.S. Pat. No. 3,806,367 discloses polymers having molecular weights from 1,000 to 100,000 containing 20–80% 2-acrylamido-2-methyl-1-propanesulfonic acid for dispersing precipitates at 25° C. in aqueous systems.

U.S. Pat. No. 3,928,196 discloses polymers having molecular weights from 1,000 to 10,000 containing 5–75 mole percent 2-acrylamido-2-methyl-1-propanesulfonic acid/25–95 mole percent acrylic acid for inhibiting calcium sulfate and calcium carbonate precipitation at 65°–66° C.

U.S. Pat. No. 4,640,793 discloses the use of a mixture of 20–80% (meth)acrylic acid/20–80% 2-acrylamido-2-methyl-1-propanesulfonic acid polymers having molecular weights up to 25,000 together with (meth)acrylic acid polymers for inhibiting calcium sulfate, calcium carbonate or calcium phosphate precipitation at 60°–65° C. in aqueous systems.

U.S. Pat. No. 4,711,725 discloses terpolymers having molecular weights from 3,000 to 25,000 containing 10–84% (meth)acrylic acid/11–40% 2-acrylamido-2-methyl-1-propanesulfonic acid and 5–50% third monomer for inhibiting the precipitation of calcium phosphate at 70° C. in aqueous systems.

Despite the large number of publications disclosing scale inhibition, dispersion and/or stabilization of aqueous systems utilizing polymers derived from (meth)acrylic acid, acrylamidoalkylsulfonic acids and other ethylenically unsaturated monomers at temperatures up to 70° C., no single conventional material or combination has been found to be completely effective at low use levels for stabilizing aqueous sytems containing all the various types of scale-forming salts commonly found in cooling tower waters operated under high temperature conditions, for example, greater than about 80° C., especially in the presence of iron and phosphate salts. No one had, heretofore, discovered that if certain known materials, used for these applications, were polymerized together in certain selected weight ratios to form a low molecular weight, water-soluble polymer composition, the best high temperature stabilization performance characteristics of each constituent could be achieved.

The present invention seeks to overcome the problems of the prior art by providing an improved process for stabilizing aqueous systems at high temperature conditions.

STATEMENT OF INVENTION

The present invention provides a method for stabilizing an aqueous system by inhibiting the precipitation of inorganic salts comprising adding to the aqueous system an effective amount of a water-soluble polymer comprising monomer units of (a) from 40 to 60 percent by weight of an unsaturated sulfonic acid selected from one or more of 2-acrylamido-2-methyl-1-propanesulfonic acid, 2-methacrylamido-2-methyl-1-propanesulfonic acid, 3-methacrylamido-2-hydroxy-1-propanesulfonic acid or salts thereof; and (b) from 40 to 60 percent by weight of an unsaturated carboxylic monomer selected from acrylic acid or methacrylic acid or salts thereof; wherein the weight average molecular weight of the polymer is from about 3,000 to about 10,000; wherein the aqueous system comprises inorganic ions selected from one or more of iron, zinc, calcium, phosphate or molybdate ions; and wherein the aqueous system is maintained at a temperature greater than about 80° C.

The present invention further provides a method for stabilizing an aqueous system by inhibiting the precipitation of inorganic salts comprising adding to the aqueous system an effective amount of a water-soluble polymer comprising monomer units of (a) from 30 to 60 percent by weight of an unsaturated sulfonic acid selected from one or more of 2-acrylamido-2-methyl-1-propanesulfonic acid, 2-methacrylamido 2-methyl-1-propanesulfonic acid, 3-methacrylamido-2-hydroxy-1-propanesulfonic acid or salts thereof; (b) from 35 to 65 percent by weight of an unsaturated carboxylic monomer selected from acrylic acid or methacrylic acid or salts thereof; and (c) from 0.1 to 10 percent by weight of an unsaturated non-ionizable monomer selected from one or more of tert-butylacrylamide, tert-octylacrylamide, dimethylacrylamide, acrylamide, acryloyl morpholine, styrene, ethyl acrylate, butyl acrylate, hydroxyethyl methacrylate or hydroxypropyl acrylate; wherein the weight average molecular weight of the polymer is from about 3,000 to about 12,000; wherein the aqueous system comprises inorganic ions selected from one or more of iron, zinc, calcium, phosphate or molybdate ions; and wherein the aqueous system is maintained at a temperature greater than about 80° C.

DETAILED DESCRIPTION

We have found that polymer compositions of selected low molecular weights, formed in selected weight ratios can be designed to incorporate the beneficial scale inhibition characteristics of each of these known monomers and result in unexpectedly improved performance as stabilizers for aqueous systems at high temperatures as compared with the corresponding conventional homopolymers, copolymers and mixtures thereof.

The polymer compositions found to be useful in the present invention contain units derived from at least two types of monomers: (1) carboxylic type and salts thereof, (2) sulfonic type and salts thereof, and optionally (3) a unit derived from certain unsaturated non-ionizable type monomers.

As used herein, the terms "(meth)acrylate" and "(meth)acrylamide" refer to either the corresponding acrylate or methacrylate and acrylamide or methacrylamide, respectively. Also, as used herein, the term "substituted" is used in conjunction with various (meth)acrylamides to indicate that one or both hydrogens attached to nitrogen of these compounds has been replaced, for example, with ($C_1$–$C_8$)alkyl or hydroxy-($C_1$–$C_8$)alkyl groups. When the term "substituted" is used in conjunction with various alkyl (meth)acrylate esters it indicates that one or more hydrogens of the alkyl groups have been replaced, for example, with hydroxyl groups.

As used herein, all percentages referred to will be expressed in weight percent unless specified otherwise. The monomer 2-acrylamido-2-methyl-1-propanesulfonic acid will be referred to hereon by the acryonym "AMPS", which is a trademark of Lubrizol Corporation (Wickliffe, Ohio, U.S.A.).

The phrase "inhibiting the precipitation" means the solubilization of scale-forming salts or reduction of the amount of precipitated scale-forming salts. The phrase "scale-forming salt" is meant to include, for example, calcium carbonate, calcium sulfate, calcium phosphate, barium sulfate and magnesium salts. By "stabilization" we mean the combination of preventing precipitation of scale-forming salts and maintaining whatever precipitate that does form at a sufficiently small particle size (below about 0.45 microns) such that the precipitate particles do not normally deposit on metal surfaces such as heat transfer surfaces, or other types of surfaces such as tower fill.

The phrase "aqueous system" is meant to include, for example, cooling water, boiler water, desalination water, sugar evaporators, geothermal process waters, multistage flash distillation systems, and pulp and paper processing waters.

The weight percent of unsaturated sulfonic acid units and salts thereof in the polymer composition can vary from 30 to 60 percent, preferably from 35 to 50 percent and most preferably from 40 to 50 percent. Unsaturated sulfonic acid monomers useful in this invention include, for example, 2-acrylamido-2-methyl-1-propanesulfonic acid, 2-methacrylamido-2-methyl-1-propanesulfonic acid, styrene sulfonic acid, vinyl sulfonic acid, 3-methacrylamido-2-hydroxy-1-propanesulfonic acid, 3-sulfopropyl acrylate, 3-sulfopropyl methacrylate or salts thereof. Preferably, the unsaturated sulfonic acid units are those of 2-acrylamido-2-methyl-1-propanesulfonic acid. Preferred salts include, for example, sodium, potassium and ammonium salts.

The weight percent of unsaturated carboxylic monomer units and salts thereof in the polymer composition can vary from 35 to 65 percent, preferably from 45 to 60 percent and most preferably from 50 to 60 percent. Unsaturated carboxylic monomers useful in this invention include, for example, acrylic acid, methacrylic acid, maleic anhydride, maleic acid or salts thereof. Preferably, the unsaturated carboxylic monomer units are those of acrylic acid or methacrylic acid, and most preferably those of acrylic acid. Preferred salts include, for example, sodium, potassium and ammonium salts.

The (meth)acrylic acid or corresponding salt-form units are believed to provide attachment of the polymer to the growing crystal or particle surfaces of the scale-forming salts to inhibit precipitation, but are ineffective when used alone, that is without sulfonic acid units in the polymer composition. The sulfonic acid or corresponding salt form units, when used at greater than about 30 weight percent, unexpectedly provide improved calcium tolerance and phosphate stabilization characteristics to the (meth)acrylic acid component and improved stabilization when iron is present.

When used, the weight percent of optional unsaturated non-ionizable monomer units in the polymer composition can vary from 0.1 to 10 percent, preferably from 0.5 to 10 percent and most preferably from 5 to 10 percent. Optional unsaturated non-ionizable monomers useful in this invention include, for example, unsubstituted or substituted (meth)acrylamides such as ($C_1$–$C_8$)alkyl or hydroxy($C_1$–$C_8$)alkyl methacrylamides and ($C_1$–$C_8$)alkyl or hydroxy($C_1$–$C_8$)alkyl acrylamides; unsubstituted or substituted (meth)acrylate esters such as ($C_1$–$C_8$)alkyl or hydroxy($C_1$–$C_8$)alkyl methacrylates and ($C_1$–$C_8$)alkyl or hydroxy($C_1$–$C_8$)alkyl acrylates; and aromatic hydrocarbon monomers such as styrene and vinyltoluene. Preferably, the optional unsaturated non-ionizable monomer units are those of one or more of tert-butylacrylamide, tert-octylacrylamide, dimethylacrylamide, acrylamide, acryloyl morpholine, styrene, ethyl acrylate, butyl acrylate, hydroxyethyl methacrylate or hydroxypropyl acrylate.

We believe that inclusion of about 5% non-ionizable monomer in the polymer composition allows lower sulfonic acid unit levels to be used for satisfactory precipitation inhibition, for example, 35% AMPS with non-ionizable monomer versus 40% AMPS without non-ionizable monomer. We also believe that using polymer compositions of the present invention containing about 5% non-ionizable monomer units allows lower dosage levels of the polymer to be used to achieve satisfactory precipitation inhibition at high background levels of iron or phosphate.

The presence of calcium and iron salts in aqueous systems containing phosphate contributes to scale formation problems. Calcium ion levels may range from 100 to 1000 ppm and typically from 200 to 600 ppm. Iron levels (ferrous or ferric ion) may range from zero to 3 ppm and typically from 0.1 to 1 ppm. Phosphate ion levels may range from 2 to 30 ppm and typically from 5 to 15 ppm.

Although it is possible to address phosphate precipitation problems in cooling water systems by using large amounts of additives, it is desirable to use low levels of additives to minimize contamination and maintain economic operations. Water-soluble polymers of the present invention may be used at levels from about 0.1 ppm to about 100 ppm by weight of the aqueous system; preferably the polymers are used from about 5 ppm to about 20 ppm to achieve satisfactory precipitation inhibition.

The polymer compositions of the present invention are useful for inhibiting the precipitation of inorganic salts over a pH range of 6.5 to about 10, preferably over a pH range from 7 to about 9. Corrosion inhibiting salts based on zinc cations or molybdate anions are also typically added to cooling water systems. Use of the polymers having the composition ranges claimed in the present invention are unexpectedly efficient at inhibiting the precipitation of inorganic salts in aqueous systems at high temperatures, i.e., greater than about 80° C., preferably from greater than 80° C. to about 100° C. Stabilized phosphate cooling water systems operated at temperatures greater than about 60° C. have difficulty maintaining surfaces free of scale and systems containing zinc salt corrosion inhibitors have similar problems above about 70° C. (see "Choosing the Correct Cooling-Water Program" by J. R. Macdonald, Chemical Engineering, January 1987). We have found that polymer compositions of the present invention unexpectedly provide stabilization for aqueous systems containing phosphate at temperatures greater than 80° C.

The polymer compositions useful in the process of the invention, containing the selected units in the selected weight ratios, have weight average molecular weights ($M_w$) ranging from about 3,000 to about 12,000, preferably from 3,000 to 10,000, and most preferably from 4,000 to 7,000. Weight average molecular weights are based on gel permeation chromatography (GPC) analysis using known poly-(meth)acrylic acid standards. For polymer compositions containing no non-ionizable monomer units, i.e, sulfonic and carboxylic units only, we believe that using higher sulfonic unit level compositions extends the upper range of molecular weight tolerance for satisfactory precipitation inhibition. We believe that inclusion of about 5–10% non-ionizable monomer into the AA/AMPS polymer compositions also extends the upper range of molecular weight tolerance for satisfactory precipitation inhibition.

Some embodiments of the invention are described in detail in the following Examples. All ratios, parts and percentages are expressed by weight unless otherwise specified, and all reagents used are of good commercial quality unless otherwise specified.

EXAMPLE 1

(Synthesis of Polymer Compositions)

The polymers useful in the present invention can be made by methods of polymerization well known to those skilled in the art. They can be prepared by aqueous polymerization, solvent polymerization or bulk polymerization. Preferably they are prepared by aqueous polymerization. The polymerizations can be conducted as batch, cofeed, heel, semicontinuous or continuous processes. Preferably the polymerization is conducted as a cofeed or continuous process.

When the polymers are prepared by a cofeed process, the initiator and monomers are generally introduced into the reaction mixture as separate streams which are fed linearly, i.e., at constant rates. The streams may be staggered so that one or more of the streams are completely fed before the others. Also, a portion of the monomers or initiators may be added to the reactor before the feeds are begun. The monomers may be fed into the reaction mixture as individual streams or combined into one or more streams.

The initiators suitable for making the polymers of the present invention are any of the conventional water-soluble free-radical initiators and redox initiators. Suitable free-radical initiators include, for example, peroxides, persulfates, peresters and azo initiators. Suitable redox initiators include, for example, peroxides such as hydrogen peroxide, and persulfates such as sodium persulfate. Mixed initiator systems can also be used, such as combination of a free radical initiator with a redox initiator. The level of initiator is generally from 0.1 to about 20 percent by weight based on the total amount of polymerizable monomers. Preferably the initiator is present at a level from about 1 to about 15 percent and most preferably at a level from about 2 to about 10 percent by weight based on the total amount of polymerizable monomer.

In addition to the initiator, one or more promoters may also be used. Suitable promoters include water-soluble salts of metal ions. Suitable metal ions include iron, copper, cobalt, manganese, vanadium and nickel. Preferably the promoters are water-soluble salts of iron or copper. When used, the promoters are present at levels from about 1 to about 100 ppm based on the total amount of polymerizable monomer. Preferably the promoters are present at levels from about 3 to about 20 ppm based on the total polymerizable monomers.

It is generally desirable to control the pH of the polymerizing monomer mixture, especially when using thermal initiators such as persulfate salts. The pH of the polymerizing monomer mixture can be controlled by a buffer system or by the addition of a suitable acid or base; the pH of the system is maintained from about 3 to about 8, and preferably from about 4 to about 6.5. Similarly, when redox couples are used there will be an optimum pH range in which to conduct the polymerization depending on the choice of the components of the redox couple. The pH of the system can be adjusted to suit the choice of the redox couple by the addition of an effective amount of a suitable acid or base.

When the polymerization is conducted as a solution polymerization using a solvent other than water, the reaction should be conducted at up to about 70 percent by weight, preferably from about 40 to about 60 percent by weight of polymerizable monomers based on the total reaction mixture. Similarly, when the polymerization is conducted as an aqueous polymerization, the reaction should be conducted at up to about 70 percent by weight, preferably from about 40 to about 60 percent by weight of polymerizable monomers based on the total reaction mixture. In general it is preferred to conduct the polymerizations as aqueous polymerizations. The solvents or water, if used, can be introduced into the reaction vessel as a heel charge, or can be fed into the reactor either as a separate feed stream or as a diluent for one of the other components being fed into the reactor.

The temperature of the polymerization reaction will depend on the choice of initiator, solvent and target molecular weight. Generally the temperature of the polymerization is up to the boiling point of the system although the polymerization can be conducted under pressure if higher temperatures are used. Preferably the temperature of the polymerization is from about 50° to about 95° C. and most preferably from about 60° to about 80° C.

Chain regulators or chain transfer agents may be employed to assist in controlling the molecular weight of the polymers. Any conventional water-soluble chain regulator or chain transfer agent can be used. Suitable chain regulators include, for example, mercaptans, hypophosphites, isoascorbic acid, alcohols, aldehydes, hydrosulfites and bisulfites. If a chain regulator or chain transfer agent is used, preferred mercaptans are 2-mercaptoethanol and 3-mercaptopropionic acid; a preferred bisulfite is sodium metabisulfite.

EXAMPLE 2

(Test Method for Phosphate Precipitation Inhibition)

The following presents the test method performed using the polymer compositions of the invention for inhibiting the precipitation of calcium phosphate in aqueous systems. The percent precipitation inhibition caused by the addition of the polymer compositions of the present invention or comparative polymers was calculated using the following formula:

$$(T/I) \times 100 = \text{Percent}(\%)\text{Inhibition}$$

where:

T equals the parts per million by weight (ppm) of phosphate ions remaining in solution at the conclusion of the test as analyzed using the ascorbic acid spectrophotometric method (APHA Standard Methods, 13th Edition, 1972, p 532) and I equals the ppm of total phosphate in the test sample.

The following general procedure was used:

Phosphate concentration analysis: DR/3000 Spectrophotometer using Hach method—DR/3000 Procedure Code P.4, Phosphorus, Reactive (orthophosphate), low range (0–2.000 milligrams/liter).

Individual stock aqueous solutions containing calcium ions (1200 ppm $Ca^{2+}$), ferrous ions (50 ppm $Fe^{2+}$) and zinc ions (250 ppm $Zn^{2+}$) were prepared from the corresponding chloride salts, except for the ferrous ion solution which was prepared from ferrous sulfate dihydrate. A stock solution containing phosphate ions (25 ppm $PO_4^{3-}$), using phosphoric acid, was also prepared.

Stock solutions (adjusted to pH 8.0) containing 0.1 percent by weight of the active polymers, expressed as the acid form, were also prepared.

To a four ounce jar the following were added in this order:

(a) 40 ml of the calcium ion stock solution, (b) 15–18 ml of polished deionized water (makeup to 100 ml final solution), (c) 1.0 ml or 2.0 ml of the polymer stock solution to yield 10 ppm (Tables 1–5) or 20 ppm (Table 5) active polymer concentrations, respectively, (d) 1.0 ml of the zinc stock solution, (e) 40 ml of the phosphate stock solution, and (f) 1.0 ml of the iron stock solution.

One sample, referred to as "100% inhibition," was made by mixing 40 ml of the phosphate stock solution with 60 ml of polished deionized water. Another sample, referred to as "no polymer," was made by mixing solutions (a) (b) (d) (e) and (f) from above, with no polymer stock solution.

| Final test component concentrations for Examples in Tables 1 and 2: | |
|---|---|
| Calcium | 480 ppm as $Ca^{2+}$ (equivalent to 1200 ppm $CaCO_3$) |
| Phosphate | 10 ppm as $PO_4^{3-}$ |
| Polymer | 10 ppm |
| Zinc | 2.5 ppm as $Zn^{2+}$ |
| Iron | 0.5 ppm as $Fe^{2+}$ |

The pH of each of the resultant mixtures was adjusted to pH 8.5. The jars were then capped and placed in a water bath at 85° C. for 17 hours. At the end of this period, the jars were removed from the bath, the solutions were filtered using a 0.45 micron filter paper and the filtered samples were allowed to cool to room temperature. The filtered solution was then diluted and analyzed for ppm phosphate using the ascorbic acid method.

Conditions used for results in Table 3 were the same as those of Tables 1 and 2 except that the temperature was adjusted to 70° C. and the amount of iron stock solution was adjusted to give 1.0 ppm iron. Conditions used for results in Table 4 were the same as those of Tables 1 and 2 except that the amount of iron stock solution was adjusted accordingly to give 0.1, 2 and 3 ppm iron; the amount of phosphate stock solution was also adjusted to give 5 ppm phosphate; and the amount of calcium stock solution was also adjusted to give 240 ppm calcium. Conditions used for results in Table 5 were the same as those of Tables 1 and 2 except that the amount of polymer stock solution was adjusted according to give 20 ppm polymer; the amount of iron stock solution was also adjusted to give 0, 1, 2 and 3 ppm iron; the amount of phosphate stock solution was also adjusted to give 16 ppm phosphate; and the amount of calcium stock solution was also adjusted to give 240 ppm calcium.

For the purposes of the present invention a percent inhibition value of greater than about 45% correlates with satisfactory performance in the stabilization of high temperature aqueous systems; percent inhibition values greater than about 50% are preferred and values greater than about 60% are most preferred for satisfactory stabilization performance.

Experimental data presented in the following Tables represent mulitiple tests in many cases (for a given polymer sample) and average values are presented with an indication of the number of tests used to obtain the average. Some data points (Examples 9, 31 and 47) deviate (experimental variation) from the general trends used to establish limits of molecular weight and polymer composition of the present invention; in these cases, numerous other data points were available to define the selected limits.

Abbreviations used in the Tables are listed below with corresponding composition descriptions.

| | |
|---|---|
| AA | Acrylic Acid |
| AMPS | 2-Acrylamido-2-methyl-1-propanesulfonic Acid |
| MAA | Methacrylic Acid |
| tBAM | tert-Butylacrylamide |
| tOAM | tert-Octylacrylamide |
| DMAM | Dimethylacrylamide |
| HPA | Hydroxypropyl Acrylate |
| EA | Ethyl Acrylate |
| AMo | Acryloyl Morpholine |

-continued

| | |
|---|---|
| SSS | Sodium Styrene Sulfonate |
| AM | Acrylamide |
| HEMA | Hydroxyethyl Methacrylate |
| BA | Butyl Acrylate |
| St | Styrene |
| AHPSE | Allylhydroxypropylsulfonate Ether |

EXAMPLES 3–26

Table 1 shows results for AA/AMPS copolymers as a function of increasing amounts of the AMPS monomer. Examples 3–8, 12, 25A and 26 (highlighted in bold) are shown for comparative purposes. Examples 9–11 and 13–25 illustrate that polymer compositions of the present invention containing the selected units and concentrations and selected molecular weight range exhibit improved phosphate stabilization over other (AA/AMPS)-containing copolymers that:

(a) contain less than about 40% AMPS (Ex #3–6), (b) contain more than about 60% AMPS (Ex #26), (c) have molecular weights greater than about 10,000 or less than about 3,000 (Ex # 7, 8, 12 and 26) or (d) contain sulfonic acid units significantly different from that of AMPS, such as AHPSE (Ex #25A).

TABLE 1

Phosphate Precipitation Inhibition
Effect of AMPS Concentration and Polymer Molecular Weight

| | Polymer Composition | | | |
|---|---|---|---|---|
| Example | % AA | % AMPS | $M_w$ | Percent Inhibition |
| 3 | 100 | 0 | 4450 | 2 |
| 4 | 77 | 23 | 4470 | 3[a] |
| 5 | 64 | 36* | 4600 | 7[a] |
| 6 | 65 | 35 | 4350 | 23[a] |
| 7 | 60 | 40 | 14400 | 33[a] |
| 8 | 60 | 40 | 11600 | 27[c] |
| 9 | 60 | 40 | 7980 | 25 |
| 10 | 60 | 40 | 7410 | 51[a] |
| 11 | 60 | 40 | 4690 | 55[c] |
| 12 | 51 | 49 | 2360 | 12 |
| 13 | 50 | 50 | 3620 | 43 |
| 14 | 50 | 50 | 3750 | 54 |
| 15 | 50 | 50 | 4080 | 44[b] |
| 16 | 50 | 50 | 4150 | 45[a] |
| 17 | 50 | 50 | 4170 | 61[b] |
| 18 | 50 | 50 | 4190 | 59[c] |
| 19 | 50 | 50 | 4450 | 47[b] |
| 20 | 50 | 50 | 4560 | 60[b] |
| 21 | 50 | 50 | 5750 | 46 |
| 22 | 50 | 50 | 5810 | 52 |
| 23 | 50 | 50 | 6800 | 81[d] |
| 24 | 50 | 50 | 6910 | 46 |
| 25 | 50 | 50 | 9340 | 65 |
| 25A** | ~50 | ~50*** | 7050 | 9[a] |
| 26 | 0 | 100 | 14200 | 1 |

[a] = average of 2 tests, [b] = 3 tests, [c] = 4 tests, [d] = 5 tests
* = (30 AMPS/6 SSS)
** = commercial polymer (approximate composition)
*** = AHPSE

EXAMPLES 27–53

Table 2 shows results for AA/AMPS polymers containing non-ionizable monomer units as a function of increasing amounts of the AMPS monomer. Examples 27–44 (highlighted in bold) are shown for comparative purposes. Examples 45–53 illustrate that polymer compositions of the present invention containing the selected units and concentrations and the selected molecular weight range exhibit improved phosphate stabilization over other (AA/AMPS/non-ionizable monomer)-containing polymers that:

(a) contain less than about 30% AMPS (Ex #27–44) or (b) have molecular weights greater than about 12,000 (Ex #27, 36 and 38).

Examples 45 and 46 indicate that inclusion of about 5% non-ionizable monomer extends the lower range of AMPS concentration to 35% for satisfactory precipitation inhibition (compare to 35% AMPS polymer without non-ionizable monomer, Example 6 in Table 1). Example 48 indicates that inclusion of about 8.5% non-ionizable monomer into the 40% AMPS polymer extends the upper range of molecular weight tolerance to greater than 10,000 for satisfactory precipitation inhibition (compare to 40% AMPS polymer at $M_w$ 11,600–14,400, Examples 7 and 8 in Table 1).

TABLE 2

Phosphate Precipitation Inhibition
Effect of Non-Ionizable Monomer Concentration

| | Polymer Composition | | | |
|---|---|---|---|---|
| Example | AA/AMPS | % Other | | $M_w$ | Percent Inhibition |
| 27 | 62/23 | 15 | DMAM | 27600 | 5 |
| 28 | 62/23 | 15 | AM | 4240 | 3[a] |
| 29 | 62/23 | 15 | HEMA | 5420 | 5 |
| 30 | 62/23 | 15 | tBAM | 5080 | 43[d] |
| 31 | 52/23 | 25 | EA | 4540 | 46 |
| 32 | 60/25 | 15 | EA | 11700 | 21[a] |
| 33 | 68/27 | 5 | tBAM | 5030 | 10[b] |
| 34 | 68/27 | 5 | tOAM | 5110 | 32[a] |
| 35 | 64.5/27 | 8.5 | tBAM | 4540 | 39[e] |
| 36 | 64.5/27 | 8.5 | DMAM | 28000 | 7 |
| 37 | 64.5/27 | 8.5 | DMAM | 4190 | 14 |
| 38 | 64.5/27 | 8.5 | tBAM | 24800 | 4 |
| 39 | 64.5*/27 | 8.5 | tBAM | 11100 | 20 |
| 40 | 64.5/27 | 8.5 | tBAM | 6970 | 4 |
| 41 | 64.5/27 | 8.5 | HPA | 5500 | 24[a] |
| 42 | 64.5/27 | 8.5 | EA | 4710 | 37[a] |
| 43 | 64.5/27 | 8.5 | AMo | 3950 | 13 |
| 44 | 65.7/27.5 | 6.8 | DMAM | 4620 | 9 |
| 45 | 60/35 | 5 | tBAM | 4280 | 54[a] |
| 46 | 60/35 | 5 | tBAM | 4310 | 57[a] |
| 47 | 60/35 | 5 | tBAM | 4620 | 26[a] |
| 48 | 51.5/40 | 8.5 | tBAM | 11200 | 49[b] |
| 49 | 45/50 | 5 | BA | 4140 | 51 |
| 50 | 45/50 | 5 | tBAM | 4510 | 80[c] |
| 51 | 45/50 | 5 | DMAM | 4560 | 58 |
| 52 | 45/50 | 5 | St | 5570 | 57 |
| 53 | 45/50 | 5 | AM | 6020 | 47 |

[a] = average of 2 tests, [b] = 3 tests, [c] = 4 tests, [d] = 5 tests, e = 14 tests
* = (49.5 AA/15 MAA)

EXAMPLES 54–56

The results in Table 3 show that polymer compositions of the present invention are unexpectedly efficient at inhibiting precipitation at elevated operating temperatures compared to compositions of the prior art. Example 54 uses the same polymer sample from Example 11 to show that excellent inhibition was achieved at the prior art temperature conditions of 70° C. while maintaining satisfactory inhibition at the high temperature conditions of the present invention. Examples 55 and 56 use the same polymers from comparative Examples 35 and 4, respectively, and demonstrate the difficulties encountered using prior art polymer compositions at the elevated temperature conditions of the present invention. Although the polymer of Example 55 performed satisfactorily at 70° C., it was unsatisfactory at 85° C. and the polymer of Example 56 was unsatisfactory at both temperature conditions.

Final test component concentrations for Examples 54–56 shown in Table 3 (same as those of Tables 1 and 2 except for iron level):

| | |
|---|---|
| Calcium | 480 ppm as $Ca^{2+}$ (equivalent to 1200 ppm $CaCO_3$) |
| Phosphate | 10 ppm as $PO_4^{3-}$ |
| Polymer | 10 ppm |
| Zinc | 2.5 ppm as $Zn^{2+}$ |
| Iron | 1.0 ppm as $Fe^{2+}$ |

TABLE 3

Phosphate Precipitation Inhibition
Effect of Temperature
Iron Level at 1.0 ppm
Other Conditions as in Example 2

| | Polymer Composition | | | Percent Inhibition | |
|---|---|---|---|---|---|
| Example | AA/AMPS | % Other | $M_w$ | 70° C. | 85° C. |
| 54 | 60/40 | 0 | 4690 | 77 | 50 |
| 55 | 64.5/27 | 8.5 tBAM | 4540 | 48 | 17 |
| 56 | 77/23 | 0 | 4470 | 6 | 3 |

EXAMPLES 57–61

The results in Table 4 show that a polymer composition of the present invention is able to satisfactorily inhibit phosphate precipitation under high temperature conditions over a wide range of background iron levels depending upon the phosphate and calcium concentrations present in the system. The 50 AA/50 AMPS polymer does not inhibit precipitation as well at high levels of phosphate (10 ppm) and calcium (480 ppm) when the iron level is increased to 2 ppm (Example 58); however, this composition has outstanding stabilization characteristics at iron levels up to 3 ppm at lower levels of phosphate (5 ppm) or calcium (240 ppm): Examples 59–61.

TABLE 4

Phosphate Precipitation Inhibition
Effect of Iron, Phosphate and Calcium Levels
Other Conditions as in Example 2
Temperature 85° C.
Polymer Composition 50 AA/50 AMPS
$M_w = 4560$

| Example | Iron Level (ppm) | Phosphate Level (ppm) | Calcium Level (ppm) | Percent Inhibition |
|---|---|---|---|---|
| 20 | 0.5 | 10 | 480 | 60[b] |
| 57 | 0.1 | 10 | 480 | 61 |
| 58 | 2 | 10 | 480 | 27 |
| 59 | 2 | 5 | 480 | 87 |
| 60 | 2 | 5 | 240 | 99 |
| 61 | 3 | 5 | 240 | 99 |

[b] = average of 3 tests

EXAMPLES 62–77

The results in Table 5 further demonstrate that polymer compositions of the present invention are able to satisfactorily inhibit phosphate precipitation under high temperature conditions over a range of background iron and phosphate levels depending upon the calcium ion level present in the system and the dosage level of polymer used.

Examples 63, 66, 69, 71 and 74 show that when phosphate levels are raised to 16 ppm, at iron levels ranging from zero to 3 ppm, poor inhibition was observed at the 10 ppm polymer dosage level. Examples 68, 70 and 75 show that when the background iron levels were increased to 2–3 ppm at the higher calcium level (480 ppm), that the 10 ppm polymer dosage did not produce satisfactory inhibition. However, by increasing the polymer dosage level to 20 ppm, the 50 AA/50 AMPS polymer showed excellent inhibition even at the highest iron level tested (Example 73). Examples 62, 64, 65, 67 and 72 further illustrate the effectiveness of the 50 AA/50 AMPS polymer over a range of iron, phosphate, calcium and polymer dosage levels.

Examples 76 and 77 show that a polymer composition of the present invention containing 5% non-ionizable monomer units (45 AA/50 AMPS/5 tBAM) provides excellent precipitation inhibition at 10 ppm polymer dosage level at high background levels of iron or phosphate. In contrast, the dosage level of the 50 AA/50 AMPS polymer composition had to be increased to 20 ppm (Examples 72 and 73) to provide adequate stabilization at the high iron or phosphate level conditions (compare to Examples 68, 74 and 75).

TABLE 5

Phosphate Precipitation Inhibition
Effect of Polymer, Iron, Phosphate and Calcium Levels
Other Conditions as in Example 2
Temperature 85° C.

| Example | Polymer Composition | Polymer Dosage (ppm) | Iron Level (ppm) | $PO_4^{3-}$ Level (ppm) | Calcium Level (ppm) | Percent Inhibition |
|---|---|---|---|---|---|---|
| 62 | see Ex #23 | 10 | 0 | 10 | 480 | 84 |
| 63 | " | 10 | 0 | 16 | 480 | 8 |
| 23 | " | 10 | 0.5 | 10 | 480 | 81[d] |
| 64 | " | 10 | 1 | 10 | 480 | 50 |
| 65 | " | 10 | 1 | 10 | 240 | 96 |
| 66 | " | 10 | 1 | 16 | 480 | 2 |
| 67 | " | 10 | 1 | 16 | 240 | 50 |
| 68 | " | 10 | 2 | 10 | 480 | 38 |
| 69 | " | 10 | 2 | 16 | 480 | 2 |
| 70 | " | 10 | 3 | 10 | 480 | 16 |
| 71 | " | 10 | 3 | 16 | 480 | 2 |
| 72 | " | 20 | 3 | 10 | 480 | 96 |
| 72 | " | 20 | 3 | 16 | 480 | 88 |
| 17 | see Ex #17 | 10 | 0.5 | 10 | 480 | 61[b] |
| 74 | " | 10 | 0.5 | 16 | 480 | 10 |
| 75 | " | 10 | 2 | 10 | 480 | 11 |
| 50 | see Ex #50 | 10 | 0.5 | 10 | 480 | 80[c] |
| 76 | " | 10 | 0.5 | 16 | 480 | 48 |
| 77 | " | 10 | 2 | 10 | 480 | 78 |

[b] = average of 3 tests, c = 4 tests, d = 5 tests

We claim:

1. A method for stabilizing an aqueous system by inhibiting the precipitation of phosphate salts comprising adding to the aqueous system an effective amount of a water-soluble polymer comprising monomer units of:

(a) from 40 to 60 percent by weight of an unsaturated sulfonic acid selected from one or more of 2-acrylamido-2-methyl-1-propanesulfonic acid, 2-methacrylamido-2-methyl-1-propanesulfonic acid, 3-methacrylamido-2-hydroxy-1-propanesulfonic acid or salts thereof; and (b) from 40 to 60 percent by weight of an unsaturated carboxylic monomer selected from acrylic acid or methacrylic acid or salts thereof; wherein the weight average molecular weight of the polymer is from about 3,000 to about 7,410; wherein the aqueous system comprises calcium, iron and phosphate ions in amounts from 100 to 1000 parts per million, zero to 3 parts per million, and 2 to 30 parts per million, respectively, wherein the amounts are parts per million by weight of the aqueous system; and wherein the aqueous system is maintained at a temperature greater than about 80° C.

2. The method of claim 1 wherein the water-soluble polymer comprises monomer units of 40 to 50 percent by weight of the unsaturated sulfonic acid and from 50 to 60 percent by weight of the unsaturated carboxylic monomer.

3. The method of claim 1 wherein the aqueous system is a cooling water system.

4. The method of claim 3 wherein the calcium, iron and phosphate ions are present in amounts from 200 to 600 parts per million, 0.1 to 1 parts per million, and 5 to 15 parts per million, respectively.

5. The method of claim 1 wherein the amount of water-soluble polymer is from about 0.1 parts per million to about 100 parts per million by weight of the aqueous system.

6. The method of claim 5 wherein the amount of water-soluble polymer is from about 5 parts per million to about 20 parts per million by weight of the aqueous system.

7. The method of claim 1 wherein the water-soluble polymer comprises 50 percent by weight of 2-acrylamido-2-methyl-1-propanesulfonic acid monomer units or salts thereof and 50 percent by weight of acrylic acid monomer units or salts thereof.

8. A method for stabilizing an aqueous system by inhibiting the precipitation of phosphate salts comprising adding to the aqueous system an effective amount of a water-soluble polymer comprising monomer units of:

(a) from 30 to 60 percent by weight of an unsaturated sulfonic acid selected from one or more of 2-acrylamido-2-methyl-1-propanesulfonic acid, 2-methacrylamido-2-methyl-1-propanesulfonic acid, 3-methacrylamido-2-hydroxy-1-propanesulfonic acid or salts thereof;

(b) from 35 to 65 percent by weight of an unsaturated carboxylic monomer selected from acrylic acid or methacrylic acid or salts thereof; and (c) from 5 to 10 percent by weight of an unsaturated non-ionizable monomer selected from one or more of tert-butylacrylamide, tert-octylacrylamide, dimethylacrylamide, acrylamide, acryloyl morpholine, styrene, ethyl acrylate, butyl acrylate, hydroxyethyl methacrylate or hydroxypropyl acrylate; wherein the weight average molecular weight of the polymer is from about 3,000 to about 12,000; wherein the aqueous system comprises calcium, iron and phosphate ions in amounts from 100 to 1000 parts per million, zero to 3 parts per million, and 2 to 30 parts per million, respectively, wherein the amounts are parts per million by weight of the aqueous system; and wherein the aqueous system is maintained at a temperature greater than about 80° C.

9. The method of claim 8 wherein the water-soluble polymer comprises monomer units of 35 to 50 percent by weight of the unsaturated sulfonic acid, from 45 to 60 percent by weight of the unsaturated carboxylic monomer and from 5 to 10 percent by weight of the non-ionizable monomer.

10. The method of claim 8 wherein the aqueous system is a cooling water system or a geothermal process water system.

11. The method of claim 10 wherein the calcium, iron and phosphate ions are present in amounts from 200 to 600 parts per million, 0.1 to 1 parts per million, and 5 to 15 parts per million, respectively.

12. The method of claim 8 wherein the amount of water-soluble polymer is from about 0.1 parts per million to about 100 parts per million by weight of the aqueous system.

13. The method of claim 12 wherein the amount of water-soluble polymer is from about 5 parts per million to about 20 parts per million by weight of the aqueous system.

14. The method of claim 8 wherein the water-soluble polymer comprises 35 to 50 percent by weight of 2-acrylamido-2-methyl-1-propanesulfonic acid monomer units or salts thereof, 45 to 60 percent by weight of acrylic acid monomer units or salts thereof and 5 to 10 percent by weight of unsaturated non-ionizable monomer selected from one or more of tert-butylacrylamide, dimethylacrylamide, acrylamide, styrene, or butyl acrylate; wherein the weight average molecular weight of the polymer is from 4,000 to 7,000.

15. The method of claim 1 wherein the aqueous system further comprises inorganic ions selected from one or more of zinc and molybdate ions.

16. The method of claim 8 wherein the aqueous system further comprises inorganic ions selected from one or more of zinc and molybdate ions.

* * * * *